(12) United States Patent
Millero, Jr. et al.

(10) Patent No.: US 8,691,929 B2
(45) Date of Patent: Apr. 8, 2014

(54) CURABLE COMPOSITIONS THAT FORM A POLYUREA DEMONSTRATING ELONGATION PROPERTIES OVER A LARGE TEMPERATURE RANGE

(75) Inventors: Edward R. Millero, Jr., Gibsonia, PA (US); Susan Fundy Donaldson, Allison Park, PA (US); Kurt G. Olson, Gibsonia, PA (US); Christina A. Winters, Freeport, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 273 days.

(21) Appl. No.: 12/948,843

(22) Filed: Nov. 18, 2010

(65) Prior Publication Data

US 2012/0130039 A1    May 24, 2012

(51) Int. Cl.
*C08G 18/10* (2006.01)
*C08G 18/32* (2006.01)
*C08G 18/50* (2006.01)

(52) U.S. Cl.
USPC ............... 528/60; 528/61; 528/65; 528/68; 528/76

(58) Field of Classification Search
USPC ................... 528/60, 61, 65, 68, 76
See application file for complete search history.

(56) References Cited

U.S. PATENT DOCUMENTS

| | | | | |
|---|---|---|---|---|
| 4,705,814 A | * | 11/1987 | Grigsby et al. | 521/159 |
| 5,140,090 A | * | 8/1992 | Champion et al. | 528/60 |
| 5,189,075 A | * | 2/1993 | Zimmerman et al. | 521/159 |
| 5,442,034 A | | 8/1995 | Primeaux, II | |
| 5,504,181 A | * | 4/1996 | Primeaux, II | 528/60 |
| 2007/0208156 A1 | | 9/2007 | Posey | |

* cited by examiner

*Primary Examiner* — Rabon Sergent
(74) *Attorney, Agent, or Firm* — Krisanne Shideler

(57) ABSTRACT

Curable compositions are provided comprising:
(a) an isocyanate-functional prepolymer having a weight average molecular weight of 4000 to 15,000; and
(b) a curing agent comprising a mixture of polyamines, wherein at least one polyamine has an amine equivalent weight of 125 to 250.

The isocyanate-functional prepolymer is a reaction product of a polyisocyanate and either (i) a polyether having primary and/or secondary amino groups or (ii) a mixture of a polyether having primary and/or secondary amino groups and a polyether having hydroxyl groups. Upon curing, the compositions demonstrate a Young's Modulus less than 500 MPa at −40° C., a percent elongation greater than 200% at −40° C., and/or a glass transition temperature less than −20° C., making them ideally suited for use at extreme temperatures.

17 Claims, No Drawings

CURABLE COMPOSITIONS THAT FORM A POLYUREA DEMONSTRATING ELONGATION PROPERTIES OVER A LARGE TEMPERATURE RANGE

FIELD OF THE INVENTION

The present invention is directed to curable compositions that form polyureas having excellent flexibility and elongation properties over large temperature ranges.

BACKGROUND

Coating compositions are used in a wide variety of industries. Such industries may include but are not limited to landcraft such as cars, trucks, sport utility vehicles, motorcycles; watercraft such as boats, ships and submarines; aircraft such as airplanes and helicopters, industrial such as commercial equipment and structures including walls and roofs; construction such as construction vehicles and structures including walls and roofs, military such as military vehicles, for example tanks and humvees, and military structures including walls and roofs, for example, ammunition cases and battery enclosures; mining industry such as construction of mine seals, mine ventilation stoppings, rescue chambers, and the like.

In these industries, coatings serve a variety of purposes such as protecting various components against damage due to corrosion, abrasion, impact, chemicals, ultraviolet light, flame and heat, and other environmental exposure as well imparting ballistic and blast mitigation properties to the components onto which they are deposited. In particular, impact resistance such as in the form of self-sealing films that resist damage to impact from small arms fire is a desirable property for coatings used in military applications, especially at extreme temperatures. Accordingly, considerable efforts have been expended to develop coating compositions with improved properties at wide temperature ranges.

SUMMARY OF THE INVENTION

In accordance with the present invention, curable compositions are provided comprising:
  (a) an isocyanate-functional prepolymer having a weight average molecular weight of 4000 to 15,000; and
  (b) a curing agent comprising a mixture of polyamines, wherein at least one polyamine has an amine equivalent weight of 125 to 250.

The isocyanate-functional prepolymer is a reaction product of a polyisocyanate and either (i) a polyether having primary and/or secondary amino groups or (ii) a mixture of a polyether having primary and/or secondary amino groups and a polyether having hydroxyl groups. Upon curing, the compositions demonstrate a Young's Modulus less than 500 MPa at −40° C., a percent elongation greater than 200% at −40° C., and/or a glass transition temperature less than −20° C.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges contained therein. Plural encompasses singular and vice versa. "Including" and like terms are open ended; that is, they mean "including but not limited to". For example, while the invention has been described herein including the claims in terms of "a" polyurea, "a" polyurethane, "an" isocyanate, "an" amine, "a" polyol, "a" polythiol, "a" prepolymer, "a" catalyst, and the like, mixtures of all of such things can be used. Also, as used herein, the term "polymer" is meant to refer to prepolymers, oligomers and both homopolymers and copolymers; the prefix "poly" refers to two or more.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used herein, the term "cure" refers to a coating wherein any crosslinkable components of the composition are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

By "ambient temperature" is meant a temperature in the range of 70 to 80° F. (21.1 to 26.7° C.). Properties of the compositions of the present invention were typically measured at 23° C. unless otherwise noted.

As used herein, the tensile strength and/or % elongation of a coating composition, after it has been applied onto a substrate and cured, was tested pursuant to the ASTM D638-08 standard.

Reference to any monomer(s) herein refers generally to a monomer that can be polymerized with another polymerizable compound such as another monomer or polymer. Unless otherwise indicated, it should be appreciated that once the monomer components react with one another to form the compound, the compound will comprise the residues of the monomer components.

The curable compositions of the present invention comprise (a) an isocyanate-functional prepolymer and (b) a curing agent.

As used herein, the term "isocyanate" includes unblocked isocyanate functional groups capable of forming a covalent bond with a reactive group such as a hydroxyl, thiol or amine functional group. Thus, isocyanate can refer to "free isocyanate", which will be understood to those skilled in the art. The isocyanate functional group can also be blocked.

The isocyanate-functional prepolymer has a weight average molecular weight of 4000 to 15,000; often 5000 to 10,000, and is a reaction product of a polyisocyanate and either (i) a polyether having primary and/or secondary amino groups or (ii) a mixture of a polyether having primary and/or secondary amino groups and a polyether having hydroxyl groups.

Suitable isocyanates typically include monomeric and/or oligomeric isocyanates. For example, the isocyanate can be $C_2$-$C_{20}$ linear, branched, cyclic, aromatic, aliphatic, or combinations thereof.

Suitable isocyanates for use in the present invention may include but are not limited to isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI, available as DESMODUR W from Bayer Corporation of Pittsburgh, Pa.); mixed aralkyl diisocyanates such as tetramethylxylyl diisocyanates, OCN—$C(CH_3)_2$—$C_6H_4C$ (CH$_3$)$_2$—NCO; polymethylene isocyanates such as 1,4-tetramethylene diisocyanate, 1,5-pentamethylene diisocyanate, 1,6-hexamethylene diisocyanate (HDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Non-limiting examples of aromatic isocyanates for use in the present invention may include but are not limited to phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate; and mixtures thereof. Aliphatic isocyanates, in particular, isophorone diisocyanate and 4,4'-methylenedicyclohexyl diisocyanate, are used most often.

In certain embodiments of the present invention, the isocyanate can include oligomeric isocyanate such as but not limited to dimers such as the uretdione of 1,6-hexamethylene diisocyanate, trimers such as the biuret and isocyanurate of 1,6-hexanediisocyanate and the isocyanurate of isophorone diisocyanate, allophonates and polymeric oligomers. Modified isocyanates can also be used, including but not limited to carbodiimides and uretone-imines, and mixtures thereof. Suitable materials include, without limitation, those available under the designation DESMODUR from Bayer Corporation of Pittsburgh, Pa. and include DESMODUR N 3200, DESMODUR N 3300, DESMODUR N 3400, DESMODUR XP 2410 and DESMODUR XP 2580.

It is advantageous to use the polyisocyanate in an excess amount, often greater than 10 percent by weight, based on the total weight of resin solids in the isocyanate-functional prepolymer (a). The excess polyisocyanate serves as a plasticizer in the curable composition.

To prepare the isocyanate-functional prepolymer, the polyisocyanate may be reacted with a polyether having primary and/or secondary amino groups.

The polyether functional polyamine; i. e., polyoxyalkyleneamines, which comprise two or more primary or secondary amino groups attached to a backbone, derived, for example, from propylene oxide, ethylene oxide, butylene oxide or a mixture thereof. Examples of such amines include those available under the designation JEFFAMINE, such as JEFFAMINE D-2000 and D-4000 (Huntsman Corporation). Such amines have an approximate molecular weight ranging from 1500 to 5000.

Alternatively, to prepare the isocyanate-functional prepolymer, the polyisocyanate may be reacted with a mixture of a polyether having primary and/or secondary amino groups such as those described above and a polyether having hydroxyl groups (polyether polyol). Examples of polyether polyols include polytetrahydrofuran materials such as those sold under the tradename TERATHANE (e.g., TERATHANE 250, TERATHANE 650, TERATHANE 1000 available from Invista Corporation).

In particular embodiments, the isocyanate-functional prepolymer is a reaction product of a polyisocyanate and a polyether having primary amino groups. For example, the isocyanate-functional prepolymer is often a reaction product of isophorone diisocyanate and JEFFAMINE D-4000.

The isocyanate-functional prepolymer has an isocyanate equivalent weight greater than 300, often 350 to 450.

The curable compositions of the present invention further comprise a curing agent comprising a mixture of polyamines. At least one polyamine in the mixture has an amine equivalent weight of 125 to 250. Such polyamines provide hardness to the cure composition.

Examples of suitable polyamines for use in the curing agent include those available under the designation JEFFAMINE, such as, without limitation, JEFFAMINE D-230, D-400, D-2000, HK-511, ED-600, ED-900, ED-2003, T-403, T-3000, T-5000, SD-231, SD-401, SD-2001, and ST-404 (Huntsman Corporation). Such amines have an approximate molecular weight ranging from 200 to 7500.

Aliphatic secondary polyamines may be used; suitable cycloaliphatic diamines include, without limitation, JEFFLINK 754 (Huntsman Corporation) and CLEARLINK 1000 (Dorf-Ketal Chemicals, LLC). The aliphatic secondary diamine often has an amine equivalent weight of up to 200, more often up to 162.

In a particular embodiment of the present invention, the curing agent comprises 5 to 50 percent by weight of an aliphatic polyamine having an amine equivalent weight of 125 to 250, and 50 to 95 percent by weight of an aliphatic polyamine having an amine equivalent weight of 900 to 2500. For example, the curing agent often comprises 20 percent by weight CLEARLINK 1000, with an amine equivalent weight of about 161, and 80 percent by weight JEFFAMINE T-5000, a trifunctional aliphatic amine that has an amine equivalent weight of about 1902.

The curing agent may further comprise additional resins having hydroxyl functional groups. Examples include polyester polyols and polyether polyols, such as the polyether polyols disclosed above. TERATHANE 650 is often used as an additional resin in the curing agent. Such resins, when used, may be present in an amount of 2 to 15 percent by weight, based on the total weight of solids in the curing agent.

In some embodiments, the composition, after application to a substrate and after curing, demonstrates a % elongation of 10. For example, in some embodiments, the % elongation can be 100, such as 200.

In certain embodiments, the curable composition may comprise one or more additional ingredients. Additional ingredients may include, for example, a flame retardant material.

Any flame retardant material known in the art can be used as the additional flame retardant material in the present invention. Such flame retardants can include, for example, those described in Paragraphs [0035] and [0038] of U.S. patent application Ser. No. 12/122,980, which paragraphs are incorporated by reference herein. Other suitable flame retardant materials include, without limitation, the flame retardant polymers disclosed in U.S. Pat. Nos. 6,015,510 (column 4, line 31 thru column 5, line 41, which excerpts are incorporated by reference herein) and 5,998,503 (column 4, line 31 thru column 5, line 41, which excerpts are incorporated by reference herein), halogenated phosphates or halogen free phosphates, powdered or fumed silica, layered silicates, aluminum hydroxide, brominated fire retardants, tris(2-chloropropyl) phosphate, tris(2,3-dibromopropyl)phosphate, tris(1,3-dichloropropyl)phosphate, diammonium phosphate, various halogenated aromatic compounds, antimony oxide, alumina trihydrate, polyvinyl chloride and the like, and mixtures thereof. In certain embodiments, the flame retardant material is tris(2-chloropropyl) phosphate, which is available from Supresta under the designation FYROL PCF. In certain embodiments, the flame retardant material may include a phosphinic salt and/or diphosphinic salt, such as those described in United States Patent Publication Nos. 2005/0004277A1 and 2005/0004278A1, from Paragraph [0025] to Paragraph [0070] in both publications, which paragraphs are incorporated by reference herein.

In some embodiments, anti-oxidants, hindered amine light stabilizing compounds, or combinations thereof may be used in the present invention as a flame retardant. Suitable anti-oxidants that may be used in the present invention include phenolic and/or phosphorus based anti-oxidants. Suitable examples of such anti-oxidants are disclosed in Table 1 of U.S. Pat. Pub. No. 2007/0203269, which Table is incorporated by reference in its entirety herein, ANNOX IC-14 (available from Chemtura Corp). Suitable hindered amine light stabilizing compounds that may be used in the present invention include polymeric hindered amine light stabilizing compounds, monomeric hindered amine light stabilizing compounds, or combinations thereof. Suitable polymeric hindered amine light stabilizing compounds include TINUVIN 266, CHIMASORB 199FL, CHIMASORB 944 FDL, TINUVIN 622 (all of which are available from Ciba), CYASORB UV3529, CYASORB UV 3346 (both of which are available from Cytec Industries), polymers with hindered amine light stabilizing functionality, or combinations thereof. Suitable monomeric hindered amine light stabilizing compounds that may be used in the present invention include CYASORB UV3853 (available from Cytec).

The composition according the present invention can further comprise any additional resins and/or additives that will impart to the composition a desired property. For example, in certain embodiments of the present invention, the polyamine component further comprises an additional resin that is different from the amine functional component. The additional resin may or may not be reactive with the polyisocyanate, and may comprise, for example, a polyether, a polyol, a thiol ether, a polycarbonate and/or a polyester. The resin may have mono-, di-, tri- or higher functionality. Such resins, when used, may be present in an amount of 2 to 15 percent by weight, based on the total weight of solids in the first reactive package.

The compositions of the present invention may optionally include materials standard in the art such as but not limited to fillers, fiberglass, stabilizers, thickeners, adhesion promoters, catalysts, colorants, including pigments, antioxidants, UV absorbers, hindered amine light stabilizers, rheology modifiers, flow additives, anti-static agents and other performance or property modifiers that are well known in the art of surface coatings, and mixtures thereof. Suitable rheology modifiers include solid and/or liquid rheology modifiers, which can be organic and/or inorganic based polymers. The rheology modifier may be an inorganic, organic, and/or polymeric material as discussed below, and may further comprise a pigment. Examples of a polymeric rheology modifier are BYK-410, BYK-410 or BYK-430 (available from Byk-Chemie). Inorganic rheology modifiers include, for example, a silica such as fumed silica and/or a clay. The clay may be selected from montmorillonite clays such as bentonite, kaolin clays, attapulgite clays, sepiolite clay, and mixtures thereof. Additionally, the clay may be surface treated as is known in the art. Any suitable surface treatment may be used; for example, one or more amines according to the following structures:

R¹—NR²R³

R¹—N⁺R²R³R⁷

R⁴—C(O)—NR⁵—R⁶—NR²R³

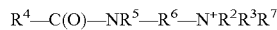
R⁴—C(O)—NR⁵—R⁶—N⁺R²R³R⁷ wherein $R^1$ and $R^4$ are independently $C_4$-$C_{24}$ linear, branched, or cyclic alkyl, aryl, alkenyl, aralkyl or aralkyl, $R^2$, $R^3$, $R^5$ and $R^7$ are independently H or $C_1$-$C_{20}$ linear, branched, or cyclic alkyl, aryl, alkenyl, aralkyl or aralkyl, and $R^6$ is $C_1$-$C_{24}$ linear, branched, or cyclic alkylene, arylene, alkenylene, aralkylene or aralkylene. As a non-limiting example, surface treated bentonite may be used, such as the alkyl ammonium bentonites described in U.S. Pat. No. 3,974,125.

In certain embodiments of the invention, the clay may be present in the curable composition at a level of at least 0.5 percent by weight, in some cases at least 1 percent by weight and in other cases at least 1.5 percent by weight, based on the total weight of the curable composition. When the amount of clay is too low, the composition can have poor rheological properties. Also, the clay can be present at up to 8 percent by weight, in some cases up to 5 percent by weight, and in other cases up to 4 percent by weight of the composition. When the amount of clay is too high, the viscosity of the composition can be too high to handle effectively. The amount of clay in the two-package composition can be any value or range between any values recited above. The clay may optionally be present in place of or in combination with other rheology modifiers.

In another embodiment of the invention, the curable composition may include a silica in addition to or in place of clay or other rheology modifiers. Any suitable silica can be used, so long as it is a suitable thixotrope. In a particular embodiment of the invention, the silica is fumed silica. Examples of commercially available silica include CABOSIL M5, available from Cabot Corporation, and AEROSIL 200, from Evonik Industries.

When present, the silica is present in the two-package composition at a level of at least 0.5 percent by weight, in some cases at least 1 percent by weight and in other cases at least 1.5 percent by weight based on the total weight of solids in the composition. When the amount of silica is too low, the composition can have poor rheological properties as well as less than desirable adhesion properties. Also, the silica can be present at up to 8 percent by weight, in some cases up to 5 percent by weight, and in other cases up to 4 percent by weight of the composition. When the amount of silica is too high, the viscosity of the composition can be too high to handle effectively. The amount of silica in the curable composition can be any value or range between any values recited above. Alternatively, the composition of the present invention may be essentially free of rheology modifiers.

In another embodiment, the coating composition of the present invention may include an adhesion promoter which may enhance adhesion of the coating composition to a substrate. When the coating composition of the present invention is applied over a first coating, an adhesion promoter may be present in the first coating composition, or it may be added to the isocyanate and/or amine of the second coating composition, or it may be applied as a separate layer directly to the substrate or first coating prior to application of the second coating thereto. When applied as a separate layer, the adhesion promoter may be applied using a variety of conventional techniques such as but not limited to wiping, dipping, roll coating, curtain coating, spraying or the like.

Non-limiting examples of suitable adhesion promoters for use in the present invention may include amine-functional materials such as 1,3,4,6,7,8-hexahydro-2H-pyrimido-(1,2-A)-pyrimidine, hydroxyethyl piperazine, N-aminoethyl piperizine, dimethylamine ethylether, tetramethyliminopropoylamine (commercially available as POLYCAT 15 from Air Products and Chemicals, Inc.), blocked amines such as an adduct of IPDI and dimethylamine, tertiary amines, such as 1,5-diazabicyclo[4.3.0]non-5-ene, 1,8-diazabicyclo[5.4.0] undec-7-ene, 1,4-diazabicyclo[2.2.2]octane, 1,5,7-triazabicyclo[4.4.0]dec-5-ene, and 7-methyl-1,5,7-triazabicyclo [4.4.0]dec-5-ene, amino silanes such as γ-aminopropyltriethoxysilane (commercially available as Silquest A1100 from Momentive Performance Materials, Inc.), melamine or amino melamine resin (e.g. Cymel 220 or Cymel 303, available from Cytec Industries Inc.), metal complexes including metal chelate complexes such as an aluminum chelate complex (e.g. K-KAT 5218 available from King Industries) or tin-containing compositions such as stannous octoate and organotin compounds such as dibutyltin dilaurate and dibutyltin diacetate, urethane acrylate compositions, salts such as chlorine phosphate, butadiene resins such as an epoxidized, hydroxyl terminated polybutadiene resin (e.g. POLY BD 605E available from Atofina Chemicals, Inc.), polyester polyols (e.g. CAPA 3091, a polyester triol available from Solvay America, Inc., and urethane acrylate compositions such as an aromatic urethane acrylate oligomer (e.g. CN999 available from Sartomer Company, Inc.); and mixtures thereof. For example, the adhesion promoter disclosed in U.S. patent application Ser. No. 11/591,312, which is incorporated in its entirety herein by reference, may be used in the present invention.

It is believed that the underlying mechanism which enhances adhesion may involve one or more phenomena such as but not limited to catalysis of a reaction between reactive groups on the substrate or previously applied coating (e.g. hydroxyl groups) and functional groups of the coating composition, reaction with the substrate or bonding with the substrate such as via hydrogen bonding, although the inventors do not wish to be bound by any mechanism.

In an embodiment, the adhesion promoter comprises at least one component selected from melamine, urethane acrylate, metal chelate complex, salt, tin-containing compound and polyhydric polymer.

Pigments serve several purposes, including coloring and/or rheology control (e. g., thixotropy) of the composition, and may be used in combinations. Pigments include $TiO_2$, carbon black and/or graphite. In particular embodiments of the present invention, a flame retardant material comprising graphite can be added to the coating compositions of the present invention. Suitable graphites are known in the art and can include natural and synthetic graphites. Non-limiting examples of suitable graphites can include expandable graphite and/or exfoliated graphite. In certain embodiments, expandable graphite in the form of a solid or powder is intercalated with an acid such as, but not limited to, organic acids (e.g. acetic acid) and inorganic acids (e.g. $H_2SO_4$ and $HNO_3$). Non-limiting examples of such graphites include commercially available graphites under the tradenames NORD-MIN from Nano Technologies, Incorporated and NYAGRAPH including but not limited to NYAGRAPH 35, 251 and 351, from Nyacol, Incorporated. Examples of fillers and adhesion promoters are further described in U.S. Publication No. 2006/0046068 and U.S. application Ser. No. 11/591,312, hereby incorporated by reference in their entirety. In certain embodiments, the curable composition may further comprise small amounts of solvent, but more often the composition may be substantially solvent-free. "Substantially solvent-free" means that the curable composition may contain a small amount of solvent, such as 5%, 2%, 1% or less.

In another embodiment, the composition of the present invention may include a colorant. As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the composition of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In an embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004, and incorporated herein by reference.

In general, the colorant can be present in the composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

Accordingly, the present invention is further directed to methods for coating a substrate comprising applying to at least a portion of the substrate any of the coating compositions described herein. In an embodiment, conventional spraying techniques may be used. In this embodiment, the isocyanate and amine may be combined such that the ratio of equivalents of isocyanate groups to equivalents of amine groups is greater than 1 and the isocyanate and amine can be applied to a substrate at a volume mixing ratio of 1:1; and the reaction mixture may be applied to an uncoated or coated substrate to form a first coating on the uncoated substrate or a subsequent coating on the coated substrate. When determining the ratio of equivalents of isocyanate groups to equivalents of reactive amine groups, the total amine groups are taken into consideration; that is the amine groups from any amine or amines used in the coating.

It will be appreciated that the present compositions are two component or "2K" compositions, wherein the isocyanate component and the amine component are kept separate until just prior to application. Such compositions will be understood as curing under ambient conditions, although a heated forced air or a heat cure can be applied to accelerate final cure or to enhance coating properties such as adhesion. In an embodiment, the sprayable coating composition may be prepared using a two-component mixing device. In this embodiment, isocyanate and amine are added to a high pressure impingement mixing device. The isocyanate is added to the "A-side" and amine is added to the "B-side". The A- and B-side streams are impinged upon each other and immediately sprayed onto at least a portion of an uncoated or coated substrate. The isocyanate and the amine react to produce a coating composition which is cured upon application to the uncoated or coated substrate. The A- and/or B-side can also be heated prior to application, such as to a temperature of 140° F. Heating may promote a better viscosity match between the two components and thus better mixing, but is not necessary for the curing reaction to occur.

Liquid compositions that are suitable for use in the present invention include liquid resin systems that are 100 percent solids, liquid resins that are dissolved or dispersed in a liquid medium, and solid particulate resins that are dispersed in a liquid medium. Liquid media may be aqueous based or organic solvent based. Often, the curable compositions of the present invention are essentially free of organic solvent and water, for example, containing less than three percent by weight of organic solvent and/or water, based on the total weight of the compositions.

The volume and/or weight mixing ratio of the isocyanate and amine may be such that the resulting isocyanate and amine reaction mixture can be applied to a substrate at a mixing ratio of 1:1. As used herein, "mixing ratio 1:1" means that the mixing ratio varies by up to 20% for each component, or up to 10% or up to 5%. Those skilled in the art would understand that other mix ratios are possible while maintaining the ratio of equivalents of isocyanate groups to equivalents of amine groups as greater than 1, since the first and second reactive components can be freely poured and mixed together in any suitable vessel or container. Any weight or volume mix ratio is possible; 1:1 is convenient.

It is believed that the ratio of equivalents of isocyanate groups to amine groups may be selected to control the rate of cure of the composition of the present invention. In certain embodiments, it has been found that cure and adhesion advantages may result when the ratio of the equivalents of isocyanate groups to amine groups (also known as the reaction index) is greater than one, such as from 1.01 to 1.30:1, or from 1.03 to 1.25:1, or from 1.05 to 1.20:1 or from 1.01 to 1.4 to 1 or from 1.01 to 1.5, or 1.3 or greater to 1. For example, good adhesion can be obtained using these ratios over clearcoats that have low surface functionality after cure, such as carbamate melamine, hydroxyl melamine, 2K urethane, and silane-containing clearcoats. The term "1:1 volume ratio"

means that the volume ratio varies by up to 20% for each component, or up to 10% or up to 5%.

In a non-limiting embodiment, a commercially available mixing device available commercially under the designation GUSMER VR-H-3000 proportioner fitted with a GUSMER Model GX-7 spray gun may be used. In this device, pressurized streams of the A- and B-side components are delivered from two separate chambers, are impacted or impinged upon each other at high velocity, to mix the two components and form a coating composition, which may be applied to an uncoated or coated substrate using the spray gun. The mixing forces experienced by the component streams may depend upon the volume of each stream entering the mixing chamber per unit time and the pressure at which the component streams are delivered. A 1:1 volume ratio of the isocyanate and amine per unit time may equalize these forces.

Another suitable application device known in the industry includes a "static mix tube" applicator. In this device, the isocyanate and amine are each stored in a separate chamber. As pressure is applied, each of the components is brought into a mixing tube in a 1:1 ratio by volume. Mixing of the components is effected by way of a torturous or cork screw pathway within the tube. The exit end of the tube may have atomization capability useful in spray application of the reaction mixture. Alternatively, the fluid reaction mixture may be applied to a substrate as a bead. A static mix tube applicator is commercially available from Cammda Corporation or Plas-Pak Industries, Inc.

The composition of the present invention may be applied as a coating to a wide variety of substrates. Non-limiting examples of suitable substrates can include, but are not limited to, metal, natural and/or synthetic stone, ceramic, glass, brick, cement, concrete, cinderblock, wood and composites and laminates thereof; wallboard, drywall, sheetrock, cement board, plastic, paper, PVC, roofing materials such as shingles, roofing composites and laminates, and roofing drywall, styrofoam, plastic composites, acrylic composites, ballistic composites, asphalt, fiberglass, soil, gravel and the like. Metals can include but are not limited to aluminum, cold rolled steel, electrogalvanized steel, hot dipped galvanized steel, titanium and alloys; plastics can include but are not limited to TPO, SMC, TPU, polypropylene, polycarbonate, polyethylene, and polyamides (Nylon). The substrates can be primed metal and/or plastic; that is, an organic or inorganic layer is applied thereto. Further, the composition of the present invention can be applied to said substrates to impart one or more of a wide variety of properties such as but not limited to corrosion resistance, abrasion resistance, impact damage, flame and/or heat resistance, chemical resistance, UV light resistance, structural integrity, ballistic mitigation, blast mitigation, sound dampening, decoration and the like. As used herein, "ballistic mitigation" refers to reducing or alleviating the effects of a bullet or other type of firearm ammunition. As used herein, "blast mitigation" refers to reducing or alleviating the secondary effects of a blast. In non-limiting examples, the composition of the present invention can be applied to at least a portion of a building structure or an article of manufacture such as but not limited to a vehicle. "Vehicle" includes but is not limited to civilian, commercial, and military land-, water-, and air-vehicles, for example, cars, trucks, boats, ships, submarines, airplanes, helicopters, humvees and tanks. The article of manufacture can be a building structure. "Building structure" includes but is not limited to at least a portion of a structure including residential, commercial and military structures, for example, roofs, floors, support beams, walls and the like.

In an embodiment, the coating composition of the present invention may be applied to a carrier film. The carrier film can be selected from a wide variety of such materials known in the art. Non-limiting examples of suitable carrier films may include, but are not limited to thermoplastic materials, thermosetting materials, metal foils, cellulosic paper, synthetic papers, and mixtures thereof. As used herein, the term "thermoplastic material" refers to any material that is capable of softening or fusing when heated and of solidifying (hardening) again when cooled. Non-limiting examples of suitable thermoplastic materials may include polyolefins, polyurethanes, polyesters, polyamides, polyureas, acrylics, and mixtures thereof. As used herein, the term "thermosetting material" refers to any material that becomes permanently rigid after being heated and/or cured. Non-limiting examples may include polyurethane polymers, polyester polymers, polyamide polymers, polyurea polymers, polycarbonate polymers, acrylic polymers, resins, copolymers thereof, and mixtures thereof. As used herein, the term "foil" refers to a thin and flexible sheet of metal. Non-limiting examples may include aluminum, iron, copper, manganese, nickel, combinations thereof, and alloys thereof. As used herein, the term "synthetic paper" refers to synthetic plain or calendered sheets that can be coated or uncoated and are made from films containing polypropylene, polyethylene, polystyrene, cellulose esters, polyethylene terephthalate, polyethylene naphthalate, poly 1,4-cyclohexanedimethylene terephthalate, polyvinyl acetate, polyimide, polycarbonate, and combinations and mixtures thereof. A non-limiting example of suitable synthetic paper is available under the tradename TESLIN from PPG Industries, Inc., Pittsburgh, Pa.

In an embodiment, a carrier film having a first and second major surface may serve as a substrate and the coating composition of the present invention may be applied to the first surface of the film to form a coating layer.

In other embodiments, the carrier film may have a film thickness of at least 0.5 µm, or at least 1 µm, or at least 2 µm, or at least 3 µm or at least 5 µm. In other embodiments, the carrier film may have a thickness of up to 100 µm, or up to 90 µm, or up to 75 µm, or up to 50 µm, or up to 40 µm. The carrier film can vary and range between any thickness recited above provided that the carrier film can adequately support the coating layer and is sufficiently flexible for a desired end use application.

In another embodiment, the carrier film may include an adhesive layer superimposed on the second surface of the film. Any suitable adhesive composition known in the art can be used to form the adhesive layer. Suitable adhesive compositions include those that contain at least one acrylic latex polymer prepared from a monomer composition that includes $C_1$-$C_5$ linear, branched, or cyclic alkyl (meth)acrylate monomers.

In a further embodiment, a temporary protective cover may be superimposed over the adhesive layer. Any suitable material can be used as the protective cover. Suitable materials include, but are not limited to, paper and polymeric materials. In these embodiments, the temporary protective cover can be removed and the second side of the carrier film may be applied or adhered to a desired substrate.

In certain embodiments, the coating composition of the present invention may be applied to a bare (e.g., untreated, uncoated) substrate, a pretreated substrate and/or coated substrate having at least one other coating. In an embodiment, the coating composition of the present invention may be applied to a multi-layer coating composite. The first coating applied to a substrate may be selected from a variety of coating compositions known in the art for surface coating substrates.

Non-limiting examples may include but are not limited to electrodepositable film-forming compositions, primer compositions, pigmented or non-pigmented monocoat compositions, pigmented or non-pigmented base coat compositions, transparent topcoat compositions, industrial coating compositions, and the like. In another non-limiting embodiment, the coating composition of the present invention may be applied to a multi-layer coating composite comprising a pretreated substrate and coating layers such as but not limited to electrocoat, primer, base coat, clear coat, and combinations thereof.

In another embodiment, the coating composition of the present invention can be used in a two-coat application resulting in a textured surface. A first coat is applied to an uncoated or coated substrate to produce a smooth, substantially tack-free layer. The Tack-Free Method is used to determine if the layer is substantially tack-free. The Tack-Free Method includes spraying the coating composition in one coat onto a non-adhering plastic sheet to a thickness of from 10 to 15 mil (254-381 microns). When spraying is complete, an operator, using a loose fitting, disposable vinyl glove, such as one commercially available under the trade name Ambidex Disposable Vinyl Glove by Marigold Industrial, Norcross Ga., gently touches the surface of the coating. The coating may be touched more than one time by using a different fingertip. When the glove tip no longer sticks to, or must be pulled from, the surface of the layer, the layer is said to be substantially tack-free. The time beginning from the completion of spraying until when the coating is substantially tack-free is said to be the tack-free time. In an embodiment, the tack-free time and the cure time may be controlled by balancing levels of various composition components such as the ratio of primary amine to secondary amine.

A second coat may then be applied to the first coating layer as a texturizing layer or "dust coating". The second coating layer can be applied by increasing the distance between the application/mixing device and the coated substrate to form discrete droplets of the coating composition prior to contacting the coated substrate thereby forming controlled non-uniformity in the surface of the second layer. The substantially tack-free first layer of the coating is at least partially resistant to the second layer; i.e., at least partially resistant to coalescence of the droplets of coating composition sprayed thereon as the second layer or dust coating such that the droplets adhere to but do not coalesce with the previous layer(s) to create surface texture. The final coating layer typically exhibits more surface texture than the first or previous coating layers. An overall thickness of the coating layers may range from 20 to 1000 mils, or from 40 to 500 mils, or from 60 to 300 mils, or from 500 to 750 mils. In a non-limiting embodiment, the first layer may be the majority of the total thickness and the dust coating may be from 15-50 mils (381-1270 microns). In various embodiments of the present invention, the "first" coating layer may comprise one, two, three or more layers; and the "second" coating layer may be one or more subsequent layers applied thereover. For example, four polyurea layers may be applied, with the fourth layer being the dust coating and each layer having a thickness from 15 to 25 mil (381-635 microns). It will be appreciated that these coating layers are relatively "thick". The coating compositions of the present invention can also be applied as much thinner layers as well, such as 0.1 to less than 15 mils, such as 0.1 to 10, 0.5 to 3, or 1 to 2 mils. Any of the endpoints within these ranges can also be combined. Such coating layers can be used alone or in conjunction with other coating layers, such as any of those known in the art or otherwise described herein. When applied at a sufficient thickness (e.g., 10 to 1000 mils, such as 100 to 200 mils, or 125 mils +/−10 mils), the present polyurea layer(s) can provide blast and/or ballistic mitigation.

In other embodiments, the coating layers may comprise the same or different polyurea or polyurea/polyurethane coating compositions. For example, the first layer may be a polyurea composition comprising aliphatic and/or aromatic amine components and/or aliphatic and/or aromatic isocyanate; and the second layer may comprise the same or different combination of aliphatic and/or aromatic amine components and/or aliphatic and/or aromatic isocyanate. "Amine component" in this context means any amine used in the present coatings. In another embodiment, the outermost coating layer may comprise a coating composition that provides a desired durability. The desired durability may depend upon the use of the coating composition of the present invention and/or the substrate to which it may be applied. In an embodiment, a combination of aliphatic and/or aromatic amine and/or isocyanate may be selected such that the composition of the outermost layer has substantial durability. For example, the outermost coating layer may have a durability from 1000 kJ to 6000 kJ, or from 800 hours to 4000 hours, when tested using a Weatherometer (Atlas Material Testing Solutions) in accordance with method SAE J1960. In this embodiment, the first layer may be a polyurea composition comprising isocyanate and amine, wherein at least one of the amine and/or polyisocyante may be aromatic, and the second layer may be a polyurea composition comprising aliphatic amine and aliphatic isocyanate.

The curable compositions of the present invention demonstrate superior physical properties such as flexibility and toughness at extreme temperatures. For example, upon curing, the composition demonstrates a Young's Modulus of less than 500 MPa, often less than 400 MPa, at −40° C. Moreover, upon curing, the composition demonstrates a glass transition temperature less than −20° C., often less than −40° C. In addition, upon curing, the composition demonstrates a percent elongation greater than 200%, often greater than 300% at −40° C.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

A comparative isocyanate-functional polymer was prepared as described below:

Example 1

Comparative Isocyanate Functional Polymer

| Ingredients | Weight (grams) |
|---|---|
| ISOPHORONE DIISOCYANATE[1] | 1348.9 |
| TERATHANE 650[2] | 1901.5 |
| DIBUTYLTIN DILAURATE | 0.2 |
| DESMODUR XP2580[1] | 2490.6 |
| DESMODUR XP2410[1] | 2490.6 |

[1]Available from Bayer Material Science.
[2]Available from INVISTA

A total of 1348.9 grams of isophorone diisocyanate and 1901.5 grams of TERATHANE 650, were added to a suitable reaction vessel equipped with a stirrer, temperature probe, condenser and a nitrogen cap. The contents of the flask were mixed well. Then 0.2 grams of dibutyltin dilaurate was added to the mixture. The contents were slowly heated to 80° C. The contents underwent an exotherm to 112° C. The reaction was held at 100° C. for 2.5 hours. The isocyanate equivalent weight of the contents was then measured and found to be 531. The temperature of the reaction mixture was lowered to 80° C. Finally, 2490.6 grams of DESMODUR XP2580 and 2490.6 grams of DESMODUR XP2410 (both available from Bayer Material Science) were added to the reaction mixture. The contents of the reactor were cooled and poured out. The final material had a measured solids of 98%, a viscosity of Y, and an isocyanate equivalent weight of 255.8.

An isocyanate-functional polymer was prepared from the following ingredients as described below:

Example 2

Isocyanate Functional Prepolymer

| Ingredients | Weight (grams) |
|---|---|
| ISOPHORONE DIISOCYANATE[1] | 2600.0 |
| JEFFAMINE D4000[2] | 5518.0 |
| DIBUTYLTIN DILAURATE | 1.62 |

[1]Available from Bayer Material Science
[2]Available from Huntsman

A total of 2600 grams of isophorone diisocyanate was placed in a suitable reaction vessel equipped with a stirrer, temperature probe, a condenser and a nitrogen inlet tube and blanketed with nitrogen gas. The contents of the flask were heated to 55° C. and then 5518 grams of JEFFAMINE D4000 and was added over 1.25 hr, during which time the temperature increased to about 56° C. After the feed was complete, 1.62 grams of DIBUTYLTIN DILAURATE was added and the mixture was heated to 70° C. The mixture was held at this temperature for 1 h, during which time the isocyanate equivalent weight reached about 400 grams per equivalent.

A grind paste for the amine component was prepared from the following ingredients as described below:

Examples 3 & 4

Grind Paste for Amine Component

| Ingredient | Example 3 wt. in parts | Example 4 wt. in parts |
|---|---|---|
| Clearlink 1000[1] | 38 | 18.0 |
| Jeffamine T5000[2] | 18.9 | 50.0 |
| Desmophen NH1220[3] | 0 | 0.0 |
| Aerosil 200[4] | 2.0 | 2.0 |
| Bentone 34[5] | 2.0 | 2.0 |
| TiPure R960-09[6] | 6.5 | 6.50 |
| Mapico Yellow Y1050A[7] | 1.29 | 1.28 |
| RO3097 KROMA Red Iron Oxide[8] | 0.19 | 0.19 |
| MONOLITE Blue 3R[9] | 0.03 | 0.03 |
| Total | 68.91 | 80.0 |

[1]Available from Dorf Ketal
[2]Available from Huntsman Corp.
[3]Available from Bayer
[4]Available from Evonik
[5]Available from Elementis Specialties
[6]Available from DuPont
[7]Available from Rockwood Pigments.
[8]Available from Elementis Specialties
[9]Available from Heubach The ingredients were combined and charged to a Premier Mill HM 1.5 VSD Series SuperMill (SPX Corporation) with an 85 percent charge of 1.0 mm Mill Mates Plus TZP grind medium (Zircoa, Inc.) and ground at a mill speed of 2400 rpm. The grinds were judged to be complete when the particle size was found to be 7.5 Hegman upon drawdown on a fineness of grind gauge.

An amine component was prepared from the following ingredients as described below:

Examples 5-6

Preparation of Amine Component

| Ingredient | Example 5 wt. in parts | Example 6 wt. in parts |
|---|---|---|
| Grind Paste of Example 3 | 68.91 | 0.0 |
| Grind Paste of Example 4 | 0.0 | 80.0 |
| Clearlink 1000[1] | 0.0 | 11.7 |
| Jeffamine T5000[2] | 0.0 | 8.3 |
| Dynasilan 1189[3] | 0.03 | 0.0 |
| Gelest SIT 8187.5[4] | 0.03 | 0.0 |
| Desmophen NH1220[5] | 29.0 | 0.0 |
| Tinuvin 328[6] | 0.03 | 0.0 |
| Tinuvin 292[6] | 2.0 | 0.0 |
| Total | 100.0 | 100.0 |

[1]Available from Dorf Ketal
[2]Available from Huntsman Corp.
[3]Available from Evonik
[4]Available from Gelest
[5]Available from Bayer Material Science Corp.
[6]Available from Ciba The ingredients listed in the table above were then added together at ambient conditions.

Examples 7 Thru 8

Polyurea coating compositions of the invention were prepared from combining an isocyanate functional "A" side component and an amine functional "B" side component in the following manner:

Free films of the polyurea coating compositions were produced by charging the A and B sides in a double barreled syringe equipped with a static mix tube and a pneumatic applicator gun (available from Plas-Pak Industries) and injecting the components at a 1:1 ratio onto a polyethylene sheet and then immediately drawn down with Gardco Adjustable Micrometer Film Applicator at approximately 0.6 mm thickness. Before testing the film properties (Young's Modulus, elongation, and glass transition temperature), the film was conditioned for 1 day at ambient temperature followed by 1 day at 140° F.

Modulus and elongation properties were measured using an INSTRON 4443 with a pull rate of 50 mm/min. at room temperature (23° C.) and low temperature (less than −20° C.) to determine low temperature performance. The glass transition temperature was measured using TA Instruments 2980 DMA Dynamic Mechanical Analyzer. The DMA test parameters included tensile film mode, 20 μm amplitude, 1 Hz frequency, 40 cNm clamping force, and heating rate of 3° C./min.

Hardness values were determined by charging the A and B sides in a double barreled syringe equipped with a static mix tube and a pneumatic applicator gun and injecting the components at a 1:1 ratio into a mold to form a round "puck" of approximately 6 cm in diameter and 0.2 cm in thickness. The puck was tested after conditioning for 1 day at ambient temperature followed by 1 day at 140° F. The hardness of the polyurea coating puck was measured with a Shore D Durometer (Pacific Transducer Corp. Model 212) at ambient conditions.

| Examples | 7 | 8 |
| --- | --- | --- |
| Isocyanate "A side" | Example 1 | Example 2 |
| Amine "B side" | Example 5 | Example 6 |
| Young's Modulus, MPa | 650.6 (23° C.) | 38.9 (23° C.) |
| (ASTM D638-08) | 923.9 (−20° C.) | 247.2 (−40° C.) |
| % Elongation | 185 (23° C.) | 696.7 (23° C.) |
| (ASTM D638-08) | 14.3 (−20° C.) | 525.0 (−40° C.) |
| Shore D Hardness (ASTM D2240) | 68 | 35 |
| Glass Transition Temperature (Tg) | 60° C. | −62.7° C. |

What is claimed is:

1. A curable composition comprising:
   (a) an isocyanate-functional prepolymer having a weight average molecular weight of 4000 to 15,000, wherein the isocyanate-functional prepolymer is a reaction product of a polyisocyanate and (i) a polyether having primary and/or secondary amino groups or (ii) a mixture of a polyether having primary and/or secondary amino groups and a polyether having hydroxyl groups; and
   (b) a curing agent comprising a mixture of polyamines, wherein at least one polyamine has an amine equivalent weight of 125 to 250;
   wherein upon curing, the composition demonstrates a Young's Modulus less than 500 MPa at −40° C.

2. The curable composition of claim 1 wherein upon curing, the composition demonstrates a Young's Modulus less than 400 MPa at −40° C.

3. The curable composition of claim 1 wherein the polyisocyanate used to prepare the isocyanate-functional prepolymer is aliphatic.

4. The curable composition of claim 1 wherein isocyanate-functional prepolymer has an isocyanate equivalent weight greater than 300.

5. The curable composition of claim 1 wherein the polyisocyanate used to prepare the isocyanate-functional prepolymer is present in an excess amount of at least 10 percent by weight, based on the total weight of resin solids in the isocyanate-functional prepolymer (a).

6. The composition according to claim 1, wherein the isocyanate-functional prepolymer is a reaction product of a polyisocyanate and a polyether having primary amino groups.

7. The composition according to claim 1, wherein the curing agent further comprises a material having hydroxyl functional groups.

8. A curable composition comprising:
   (a) an isocyanate-functional prepolymer having a weight average molecular weight of 4000 to 15,000, wherein the isocyanate-functional prepolymer is a reaction product of a polyisocyanate and (i) a polyether having primary and/or secondary amino groups or (ii) a mixture of a polyether having primary and/or secondary amino groups and a polyether having hydroxyl groups; and
   (b) a curing agent comprising a mixture of polyamines, wherein at least one polyamine has an amine equivalent weight of 125 to 250;
   wherein upon curing, the composition demonstrates a glass transition temperature less than −20° C.

9. The curable composition of claim 8 wherein upon curing, the composition demonstrates a glass transition temperature less than −40° C.

10. The curable composition of claim 8 wherein the polyisocyanate used to prepare the isocyanate-functional prepolymer is aliphatic.

11. The curable composition of claim 8 wherein the polyisocyanate used to prepare the isocyanate-functional prepolymer is present in an excess amount of at least 10 percent by weight, based on the total weight of resin solids in the isocyanate-functional prepolymer (a).

12. The composition according to claim 8, wherein the curing agent further comprises a material having hydroxyl functional groups.

13. A curable composition comprising:
   (a) an isocyanate-functional prepolymer having a weight average molecular weight of 4000 to 15,000, wherein the isocyanate-functional prepolymer is a reaction product of a polyisocyanate and (i) a polyether having primary and/or secondary amino groups or (ii) a mixture of a polyether having primary and/or secondary amino groups and a polyether having hydroxyl groups; and
   (b) a curing agent comprising a mixture of polyamines, wherein at least one polyamine has an amine equivalent weight of 125 to 250;
   wherein upon curing, the composition demonstrates a percent elongation greater than 200% at −40° C.

14. The curable composition of claim 13 wherein upon curing, the composition demonstrates a percent elongation greater than 300% at −40° C.

15. The curable composition of claim 13 wherein the polyisocyanate used to prepare the isocyanate-functional prepolymer is aliphatic.

16. The curable composition of claim 13 wherein the polyisocyanate used to prepare the isocyanate-functional prepolymer is present in an excess amount of at least 10 percent by weight, based on the total weight of resin solids in the isocyanate-functional prepolymer (a).

17. The composition according to claim 13, wherein the curing agent further comprises a material having hydroxyl functional groups.

* * * * *